April 13, 1926.  
D. C. LAWSON  
DRIVE FOR ROVING FRAMES  
Filed Jan. 15, 1924
1,580,308
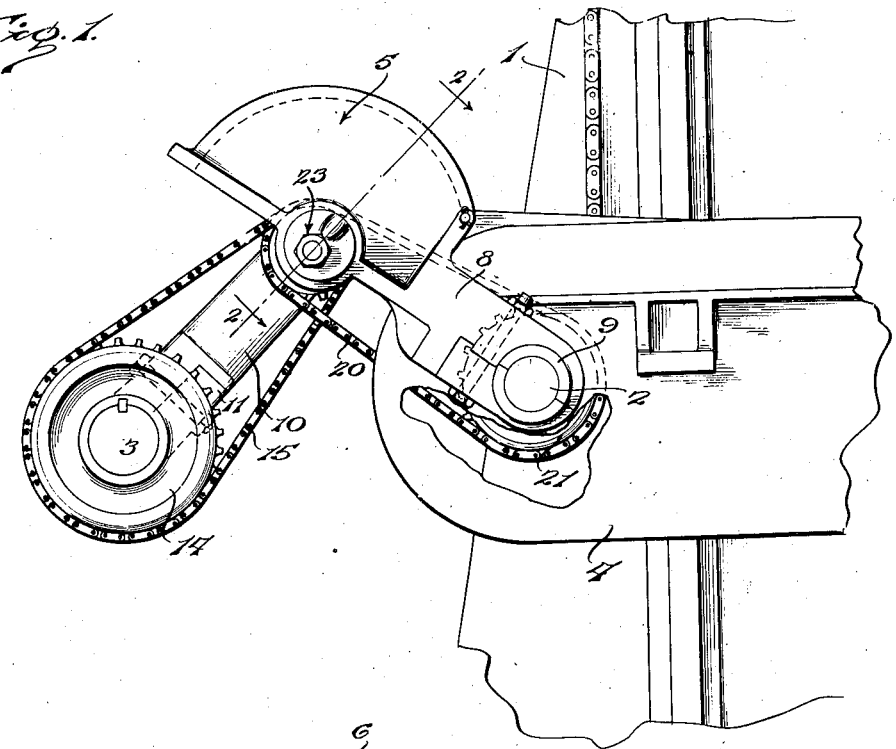
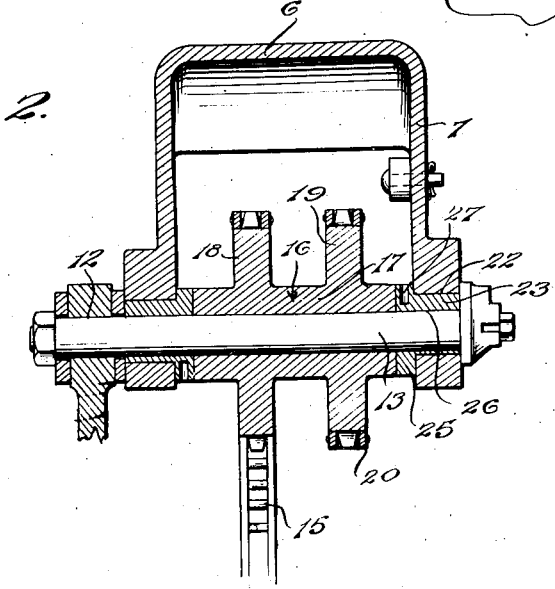
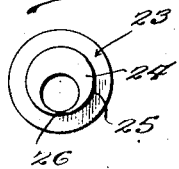
Inventor
D. C. Lawson
By Lacey & Lacey, Attorneys Patented Apr. 13, 1926.

1,580,308

UNITED STATES PATENT OFFICE.

DAVID C. LAWSON, OF KNOXVILLE, TENNESSEE, ASSIGNOR OF ONE-HALF TO LAWRENCE D. TYSON, ONE-EIGHTH TO S. W. DUGGAN, AND ONE-EIGHTH TO M. A. STORY, ALL OF KNOXVILLE, TENNESSEE.

DRIVE FOR ROVING FRAMES.

Application filed January 15, 1924. Serial No. 686,419.

*To all whom it may concern:*

Be it known that I, DAVID C. LAWSON, a citizen of the United States, residing at Knoxville, in the county of Knox and State of Tennessee, have invented certain new and useful Improvements in Drives for Roving Frames, of which the following is a specification.

This invention relates to improvements in drives for roving frames.

Heretofore it has been customary to transmit power to the bobbin drive shaft by a train of intermeshing gears, but it has been found impracticable to operate this type of gearing at a high rate of speed, when installed in this particular relation, and furthermore considerable power is required to operate this type of gearing. It is proposed to employ sprocket and chain gearing for such a drive, and the object of the present invention is to provide means whereby any slack in the chain may be readily compensated for so that a constant and uniform tension will be maintained on the chain and thereby provide against any irregular transmission of power to the bobbin driving shaft.

In the accompanying drawing:

Figure 1 is a side elevation of the drive embodying the invention;

Figure 2 is a sectional view on the line 2—2 of Figure 1;

Figure 3 is a view in side elevation of one of the eccentric bearings for the intermediate shaft of the drive.

In Figure 1 of the drawings there is illustrated so much of a roving frame as is necessary to an understanding of the invention and in this figure the numeral 1 indicates one of the upright sides of the machine. The numeral 2 indicates the bobbin drive shaft, and the numeral 3 indicates the main drive shaft. The bobbin drive shaft 2, together with its companion shaft (not shown), is mounted in a head 4 vertically adjustably supported upon the side member 1. The numeral 5 indicates in general a housing for the drive and this housing comprises a top 6 and sides 7. The sides 7 are provided with rearward extensions 8 which are in turn provided with bearings 9 at their rear ends to loosely fit the bobbin drive shaft 2. The numeral 10 indicates an arm which is provided at its lower end with a bearing 11 loosely fitting the shaft 3, and this arm at its upper end has a bearing opening 12 to loosely receive the intermediate or counter-shaft of the drive which is indicated by the numeral 13. A sprocket gear 14 is fixed upon the main drive shaft 3, and a sprocket chain 15 is trained about this gear and about one sprocket of a double or twin sprocket gear indicated in general by the numeral 16. The said double sprocket comprises a sleeve 17 loosely fitting the shaft 13, and sprockets 18 and 19 which are suitably spaced upon the sleeve, the sprocket chain 15 being trained about the gear 18 as shown in Fig. 2 of the drawing. A sprocket chain 20 is trained about the sprocket gear 19 and also about the sprocket gear 21 fixed upon the bobbin drive shaft 2. At this point it will be evident that power is transmitted continuously from the shaft 3 to the bobbin drive shaft 2 and that the head 4 which supports the shaft 2 and its companion head (not shown) may have up and down movement upon the side members of the frame without interfering with the communication of power to the said bobbin drive shaft.

As heretofore stated the invention contemplates the provision of means for taking up slack in the drive chains 15 and 20, and this is accomplished by providing an eccentric mounting for the shaft 13 as will now be explained. The side members 7 of the hood 5 are provided with bearing openings 22, and rotatably fitted in each of these openings is a bearing indicated in general by the numeral 23. Each bearing 23 comprises a cylindrical body portion 24 which rotatably fits within the respective opening 22 and which is provided at its inner end with an annular circumscribing flange 25 which seats against the inner face of the respective side member 7 of the hood. An opening 26 is formed in each bearing member and is of cylindrical contour and is so arranged that its axis is eccentric to the axis of the body member of the bearing as most clearly shown in Figure 3 of the drawings. Nuts are threaded onto the ends of the shaft and prevent displacement of the shaft with relation to the bearings 23 and likewise hold the bearings 23 in place within the openings 22. The two bearings 23 have their flanges 25 formed with sockets 27 to permit of the application of a suitable tool for the purpose of rotating the bearing members so that the shaft may be adjusted with relation to the shafts 2 and 3 so as to equally tension the chains 15 and 20.

From the foregoing description of the invention it will be seen that there is provided a highly effective means for adjusting the intermediate or counter-shaft 13 so as to take up slack in either of the chains 15 and 20, and that an exceptionally fine degree of adjustment may be obtained so that the two chains may be equally tensioned thereby insuring a steady and uniform transmission of power to the bobbin drive shaft 2.

Having thus described the invention, what is claimed as new is:

The combination, in a jointed frame drive, of a main drive shaft, a driven shaft, a hood having side members and arms extending therefrom and swingingly connected with the driven shaft, an arm swingingly connected with the main drive shaft, means supporting the driven shaft for up and down movement with relation to the main drive shaft, the hood having cylindrical openings in its opposite walls, bearing members having cylindrical portions rotatably adjustably fitted in the openings, the said bearing members having openings in their said cylindrical portions located eccentrically to their axes, said bearing members being each provided with a circumferential flange at its inner end bearing against the inner side of the wall of the hood in which its cylindrical portion is fitted, the outer ends of the said cylindrical portions of the bearings being flush with the outer surfaces of the respective walls, a shaft mounted at its ends in the openings in the bearings, a double sprocket freely rotatably mounted upon the shaft between the flanged ends of the bearing members, means upon the ends of the shaft engaging the outer sides of the walls of the hood and the outer ends of the cylindrical portions of the bearing members to prevent longitudinal displacement of the said bearing members, the said shaft, and the double sprocket, the said arm being pivotally connected with the shaft, sprocket gears upon the main drive shaft and driven shaft, and sprocket chains trained about the gears upon the said main drive shaft and driven shaft and about the double sprocket.

In testimony whereof I affix my signature.

DAVID C. LAWSON. [L. S.]